United States Patent

[11] 3,629,550

| [72] | Inventor | Bengt Henry Carlsson<br>Goteborg, Sweden |
|---|---|---|
| [21] | Appl. No. | 19,865 |
| [22] | Filed | Mar. 16, 1970 |
| [45] | Patented | Dec. 21, 1971 |
| [73] | Assignee | Kristofer Joakim Lehmkuhl<br>Geneva, Switzerland |
| [32] | Priority | Apr. 2, 1969 |
| [33] | | Sweden |
| [31] | | 4753/69 |

[54] APPARATUS FOR THE PRODUCTION OF STEAM FOR HUMIDIFYING AIR
1 Claim, 1 Drawing Fig.

[52] U.S. Cl............................................... 219/285,
122/451 R, 137/386, 219/273, 219/324
[51] Int. Cl............................................... H05b 3/60
[50] Field of Search..................................219/284-295,
271-276, 323, 324; 137/386, 392;
122/451

[56] References Cited
UNITED STATES PATENTS

2,451,594  10/1948  Watson............................ 219/292
2,612,592  9/1952  Paulison et al................. 219/286
2,748,254  5/1956  Watson......................... 219/286
2,821,614  1/1958  Jansons........................ 219/291 X
3,219,796  11/1965  Graf et al..................... 219/273 X

FOREIGN PATENTS

254,369  12/1948  Switzerland.................. 219/295

Primary Examiner—A. Bartis
Attorney—Young & Thompson

ABSTRACT: An apparatus for the production of steam for air humidifying purposes, in which water is vaporized in an electrode container by passing current through the water between electrodes. For water level control a further container is provided communicating with the electrode container, and to which a water refill conduit is connected provided with an electrically operated valve. An energy regulator is electrically connected to the valve and is adjustable in such a manner that the current supply to the valve and thus also the water level in the electrode container can be determined.

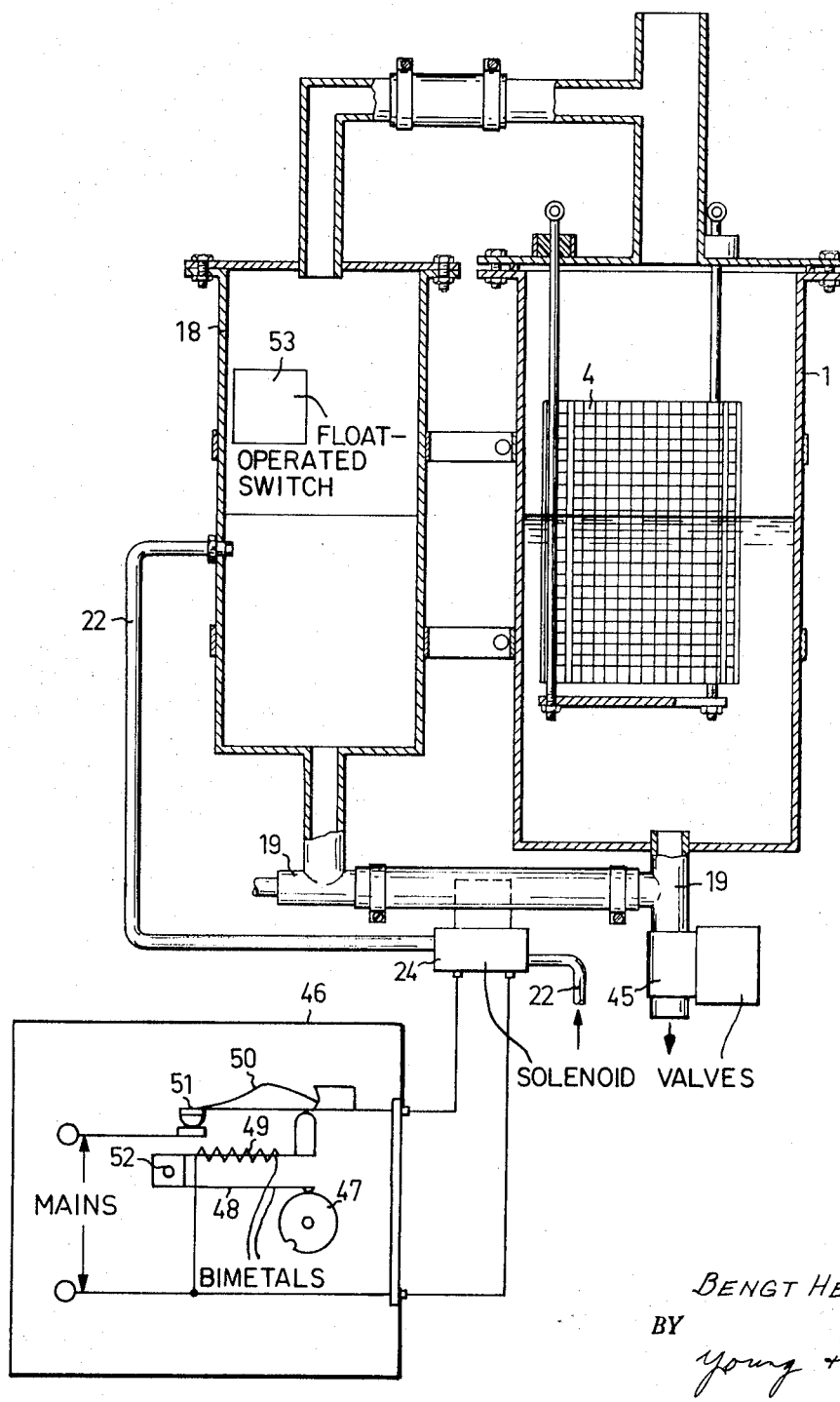

APPARATUS FOR THE PRODUCTION OF STEAM FOR HUMIDIFYING AIR

FIELD OF THE INVENTION

The present invention relates to an apparatus for the production of steam for air humidifying purposes, in which water is vaporized in a container provided with electrodes, by passing current through the water between the electrodes, and wherein for water level control a further container is provided communicating with the electrode container, and to which a water refill conduit is connected provided with an electrically operated valve.

BACKGROUND OF THE INVENTION a. The Prior Art

An apparatus of the type referred to is known in the art, in which the water level is regulated by means of a float mechanism adapted to actuate a switch which, at a predetermined water level, causes a solenoid valve to close, whereupon the supply of water to the regulator container is interrupted. Mounted in this latter container is also a float-operated safety valve, which closes at a predetermined maximum level, for example, if for some reason the solenoid valve should fail to function.

The aforedescribed device for regulating the level of the water have been found to present certain disadvantages. For example, the float-operated switch causes the level of the water to be regulated intermittently and in a jerky fashion, whereby sudden variations in the electrical current to the electrodes occur and electrically operated safety devices incorporated in the apparatus may be triggered. Furthermore, the safety valve is not absolutely reliable in function, since impurities in the water, such as lime, are deposited on the valve body and the valve seating in a manner which causes a leakage between these elements.

b. Summary of the Invention

The invention therefor relates to an apparatus of the type referred to, having a level-regulating means which does not present the aforementioned disadvantages, and the apparatus is mainly characterized by an energy regulator electrically connected to the valve which regulator is adjustable in a manner whereby the current supply to the valve, and thus also the water level in the control container, are determinable.

This adjustable regulator affords the advantage whereby the amount of water supplied can be determined very accurately and whereby said variations in current are practically completely eliminated.

BRIEF DESCRIPTION OF THE DRAWING

The invention will now be described with reference to the accompanying drawing, the single FIGURE of which illustrates an embodiment of an apparatus constructed in accordance with the invention.

DESCRIPTION OF THE PREFERRED EMBODIMENT

The FIGURE shows an electrode container 1, having electrodes 4, and a level control container 18 which communicates with the container 1 and to which water is supplied via a conduit 22. Connected in the conduit 22 is a solenoid valve 24, which regulates the supply of water to the container 18 and therewith to the electrode container 1. Arranged within the container 18 is a diagrammatically illustrated, float-operated safety switch 53 which causes the total current supply to the apparatus to cease if the level of the water should exceed a maximum permitted value as a result, for example, of leakage in the solenoid valve 24. The control container 18 with the switch 53 may also be replaced by some other form of safety means of a more compact structure, without impairing the reliability and mode of operation of the humidifying apparatus, e.g. such safety means is an overfill safety device in the form of a pressure loop of the U-tube type, which naturally is also in communication with the electrode container 1, for water supply thereto. The solenoid valve is operated by means of a regulator 46, having a setting wheel or cam 47. The regulator 46 is only shown diagrammatically in the drawing. The regulator includes in the present case a bimetal strip 49 enclosed by a heater winding, the strip 49 with a further bimetal strip 48 being pivoted at 52. The free end of the strip 48 is provided with a cam follower and function to compensate for variations in ambient temperature. The strip 49 acts upon a snap-action switch 50 operating a contact 51 connected in the electrical supply circuit for the solenoid of valve 24. The wheel or cam 47 may be operated manually for adjusting the on-time of the contact 51. The regulator operates as follows.

Normally the contact 51 is closed so that current flows through the heater winding on the bimetal 49 and through the load, i.e., the valve solenoid. The bimetal warms and, in bending, opens the switch 50, interrupting the current both to the heater winding and to the load. The bimetal then cools and the cycle is repeated The ratio of the time during which the contact 51 is closed, to the total time of the cycle, determines the average input. This ratio is controlled by the cam 47. Clearly if the cam is set so that the switch 50 remains closed with the maximum deflection of the bimetal, the power will be permanently on, if the cam is turned until the contact 51 is open with the bimetal cold, the power will be permanently off. Between these two limits the input is continuously adjustable. Since the same voltage is applied to the regulator as is applied to the load, any variation will affect the two similarly so that the average input is independent of applied voltage over a wide range. The regulator 46 thus controls, via the solenoid valve, the energy consumed in the electrode container for steam generating purposes, it being possible to measure the current to the electrode system by means of a current meter. The deflection of the meter is naturally dependent on the level of the water in the container 1, and thus also on the setting of the regulator 46. In the case of an apparatus which is adapted to generate steam for a humidifying plant of determined size, the cam 47 can therefor be set directly, so that the meter shows a determined current value which corresponds to a determined level.

It is obviously not necessary for the energy regulator described above to be a bimetal-controlled device but may be any other adjustable periodically operating switch. Nor must the valve be of the above-mentioned type since for instance also motor-driven or similar valves can fill the same purpose.

The current supply connections of the apparatus may also incorporate monitoring means in the form of, for example, a hygrometer and an operating switch which breaks the current when, for example, a predetermined humidity is exceeded. In all cases when the apparatus is without current supply, a solenoid an outlet 45 is open, said solenoid valve being connected in an outlet line 19 from the container 1 and 18, so that said containers are emptied and are empty when the apparatus is restarted. This avoids a current surge when starting the apparatus.

The aforedescribed measures proposed in accordance with the invention constitute an excellent solution to the problems referred to in the introduction and make particularly reliable operation possible.

What I claim is:

1. Apparatus for the production of steam, comprising a container, electrodes in he container for passing current through the water between the electrodes to produce steam, and water refill means for said container, said refill means comprising an electrically operated valve and an energy regulator electrically connected to the valve, said regulator comprising a switch in circuit with the valve, cycling means for cyclically opening and closing the switch to open and close the valve, and means for adjusting the cycling means such that a predetermined ratio between the period the switch is open and the period the switch is closed in each cycle can be established, whereby the water level in said container is a direct function of said predetermined ratio.

* * * * *